(12) United States Patent
Maruo et al.

(10) Patent No.: US 9,802,841 B2
(45) Date of Patent: *Oct. 31, 2017

(54) METHOD FOR TREATING HEXAVALENT CHROMIUM-CONTAINING AQUEOUS SOLUTION

(71) Applicant: PANASONIC CORPORATION, Osaka (JP)

(72) Inventors: Yuko Maruo, Osaka (JP); Daisuke Ino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 496 days.

This patent is subject to a terminal disclaimer.

(21) Appl. No.: 14/172,609

(22) Filed: Feb. 4, 2014

(65) Prior Publication Data
US 2014/0151302 A1 Jun. 5, 2014

Related U.S. Application Data

(63) Continuation of application No. PCT/JP2013/003590, filed on Jun. 6, 2013.

(30) Foreign Application Priority Data

Jun. 14, 2012 (JP) .................. 2012-134414

(51) Int. Cl.
C02F 1/42 (2006.01)
C02F 1/44 (2006.01)
(Continued)

(52) U.S. Cl.
CPC ............ *C02F 1/444* (2013.01); *B01D 61/147* (2013.01); *B01D 61/16* (2013.01); *B01D 63/082* (2013.01);
(Continued)

(58) Field of Classification Search
CPC ........ A01G 31/00; B01D 53/86; B01D 61/16; B01D 61/147; B01D 63/082;
(Continued)

(56) References Cited

U.S. PATENT DOCUMENTS 2,103,572 A 12/1937 Wells
2,569,243 A * 9/1951 Kovacs .................. B01D 29/21
210/446
(Continued)

FOREIGN PATENT DOCUMENTS

CN 1269330 A 10/2000
CN 101264953 A 9/2008
(Continued)

OTHER PUBLICATIONS

Xu et al. (Photoactivity of Titanium Dioxide Supported on MCM41, Zeolite X. and Y, J. Phys. Chem. B, 101 pp. 3115-3121, 1997).*
(Continued)

*Primary Examiner* — Dirk Bass
*Assistant Examiner* — Hayden Brewster
(74) *Attorney, Agent, or Firm* — McDermott Will & Emery LLP

(57) ABSTRACT

Provided is a method for treating a hexavalent chromium-containing aqueous solution by water treatment employing a titanium dioxide photocatalyst that is excellent in both photocatalytic activity and solid-liquid separation performance. The method according to the present disclosure includes the steps of: adding catalyst particles to the aqueous solution; reducing hexavalent chromium by irradiating the aqueous solution with light having a wavelength of 200 nanometers or more and 400 nanometers or less while stirring the catalyst particles in the aqueous solution; and stopping the stirring and separating the catalyst particles from the aqueous solution by sedimentation. Each catalyst (Continued)

particle is composed only of a titanium dioxide particle and a zeolite particle, the titanium dioxide particle is adsorbed on the outer surface of the zeolite particle, the zeolite particle has a silica/alumina molar ratio of 10 or more, and the catalyst particles are contained in the aqueous solution at a concentration of 0.4 grams/liter or more and 16 grams/liter or less.

6 Claims, 7 Drawing Sheets

(51) Int. Cl.
| | |
|---|---|
| B01J 29/08 | (2006.01) |
| C02F 1/32 | (2006.01) |
| C02F 1/70 | (2006.01) |
| B01D 61/14 | (2006.01) |
| B01D 61/16 | (2006.01) |
| B01D 63/08 | (2006.01) |
| B01J 37/06 | (2006.01) |
| B01J 37/34 | (2006.01) |
| B01J 21/06 | (2006.01) |
| B01J 35/00 | (2006.01) |
| B01J 35/02 | (2006.01) |
| C02F 1/72 | (2006.01) |
| B01D 15/04 | (2006.01) |
| C02F 101/22 | (2006.01) |
| C02F 1/00 | (2006.01) |

(52) U.S. Cl.
CPC ............ *B01J 21/063* (2013.01); *B01J 29/08* (2013.01); *B01J 35/004* (2013.01); *B01J 35/023* (2013.01); *B01J 37/06* (2013.01); *B01J 37/343* (2013.01); *C02F 1/32* (2013.01); *C02F 1/70* (2013.01); *C02F 1/725* (2013.01); *B01D 2311/04* (2013.01); *B01D 2311/12* (2013.01); *B01D 2311/2619* (2013.01); *B01D 2311/2638* (2013.01); *B01D 2315/06* (2013.01); *C02F 2001/007* (2013.01); *C02F 2101/22* (2013.01); *C02F 2305/10* (2013.01); *Y02W 10/37* (2015.05)

(58) Field of Classification Search
CPC ............ B01D 2311/04; B01D 2311/12; B01D 2311/263; B01D 2311/2619; B01D 2311/2638; B01D 2311/2642; B01D 2311/2649; B01D 2315/06; B01J 2/00; B01J 2/21; B01J 19/12; B01J 19/24; B01J 21/06; B01J 21/063; B01J 23/30; B01J 23/745; B01J 29/08; B01J 29/48
USPC ....... 210/638, 660, 748.14; 385/12, 31, 123, 385/144; 423/700, 716
See application file for complete search history.

(56) References Cited

U.S. PATENT DOCUMENTS

| | | | |
|---|---|---|---|
| 4,222,873 A | | 9/1980 | Parsons |
| 4,419,218 A | * | 12/1983 | Angevine ............... C10G 47/16 208/111.01 |
| 4,652,360 A | * | 3/1987 | Dessau ................. C10G 35/095 208/137 |
| 5,182,030 A | | 1/1993 | Crittenden et al. |
| 6,007,724 A | | 12/1999 | Kulprathipanja et al. |
| 6,251,264 B1 | | 6/2001 | Tanaka et al. |
| 6,566,300 B2 | | 5/2003 | Park et al. |
| 6,771,866 B2 | | 8/2004 | Iimura |
| 9,290,394 B2 | * | 3/2016 | Maruo ...................... C02F 1/32 210/666 |
| 2002/0040874 A1 | | 4/2002 | Kantzas et al. |
| 2002/0098977 A1 | * | 7/2002 | Park ................... B01D 53/8609 502/350 |
| 2003/0026585 A1 | * | 2/2003 | Iimura ..................... G02B 6/02 385/144 |
| 2003/0178372 A1 | | 9/2003 | Droughton et al. |
| 2003/0196966 A1 | | 10/2003 | Hughes |
| 2006/0091079 A1 | | 5/2006 | Meng et al. |
| 2006/0108290 A1 | | 5/2006 | Basset et al. |
| 2007/0158272 A1 | * | 7/2007 | Vignola .................. C02F 1/281 210/660 |
| 2007/0203385 A1 | | 8/2007 | Chang et al. |
| 2008/0145704 A1 | | 6/2008 | Scranton |
| 2009/0020477 A1 | | 1/2009 | Dhekane et al. |
| 2010/0135864 A1 | * | 6/2010 | Taniguchi ................. A61L 9/18 422/121 |
| 2010/0193449 A1 | | 8/2010 | Shang et al. |
| 2010/0264084 A1 | | 10/2010 | Midorikawa et al. |
| 2010/0305386 A1 | | 12/2010 | Nakamura |
| 2011/0124492 A1 | | 5/2011 | Loukine et al. |
| 2012/0258852 A1 | * | 10/2012 | Martinez ................ B01J 29/041 502/60 |
| 2013/0000510 A1 | * | 1/2013 | Ribeiro ................... C01B 39/16 106/31.9 |
| 2013/0153463 A1 | * | 6/2013 | Geerinck ............... C10G 47/20 208/60 |
| 2014/0151301 A1 | * | 6/2014 | Maruo ................... B01J 35/004 210/638 |

FOREIGN PATENT DOCUMENTS

| | | |
|---|---|---|
| CN | 101492199 A | 7/2009 |
| CN | 101829556 A | 9/2010 |
| CN | 101920190 A | 12/2010 |
| CN | 102167437 A | 8/2011 |
| JP | 09-141255 A | 6/1997 |
| JP | 10-249210 A | 9/1998 |
| JP | 11-500660 A | 1/1999 |
| JP | 11-253755 A | 9/1999 |
| JP | 11-335187 A | 12/1999 |
| JP | 2003-334422 A | 11/2003 |
| JP | 2006-212552 A | 8/2006 |
| JP | 2008-194568 A | 8/2008 |
| JP | 2009-112403 A | 5/2009 |
| JP | 2010-069449 A | 4/2010 |
| WO | 96/26903 A1 | 9/1996 |

OTHER PUBLICATIONS

Keller et al. (Stability and Aggregation of Metal oxide Nanoparticles in Natural Aqueous Matrices, Environ. Sci. Technol. (2010), pp. A-F).*
Song et al. (The effects of particle size distribution on the optical properties of titanium dioxide titanium dioxide rutile pigments and their applications in cool non-white coatings, Solar Energy Mat. and Solar Cells, 130 (Nov. 2014), pp. 42-50).*
Ku et al., "Photocatalytic Reduction of Cr(VI) in Aqueous Solutions by UV Irradiation with the Presence of Titanium Dioxide," Water Research, vol. 35, No. 1, Dec. 31, 2001, pp. 135-142.
Chinese Search Report issued in Chinese Application No. 201380002164.1 dated Sep. 28, 2015, with English translation.
Maruo et al., "Development of dispersion-type TiO2 photocatalyst for decomposition of medical drugs in water," Book of reprints of the 77th Annual Meeting of the Society Chemical of Engineers, Japan, The Society of Chemical Engineers, Japan 2012, p. 427, K123, with partial English translation.
Wang et al., "Photocatalytic reduction of Cr(VI) over different TiO2 photocatalysts and the effects of the dissolved organic species,", Journal of Hazardous Materials, vol. 152, No. 1, (2008) pp. 93-99.
International Search Report issued in International Application No. PCT/JP2013/003590 dated Jul. 9, 2013, with English translation, 2 pgs.

(56) References Cited

OTHER PUBLICATIONS

Non-Final Office Action issued in related U.S. Appl. No. 14/172,584, dated Nov. 9, 2015.
Non-Final Office Action issued in related U.S. Appl. No. 14/172,584, dated Aug. 8, 2016.
Chinese Office Action issued in Chinese Patent Application No. 201380002120.9, dated Oct. 9, 2015; with English transation.
Dutta et al., "Photocatalytic Oxidation of Arsenic(III): Evidence of Hydroxyl Radicals," Environmental Science and Technology, vol. 39, No. 6, (2005), p. 1827-1834.
International Search Report issued in International Application No. PCT/JP2013/003589 dated Jul. 9, 2013, with English translation, 3 pgs.
Levy et al., "TiO2-Photocatalytic Reduction of Pentavalent and Trivalent Arsenic: Productions of Elemental Arsenic and Arsine," Environmental Science & Technology, vol. 46, (2012) pp. 2299-2308.
Notice of Allowance issued in related U.S. Appl. No. 14/172,584, dated Dec. 2, 2016.

\* cited by examiner

METHOD FOR TREATING HEXAVALENT CHROMIUM-CONTAINING AQUEOUS SOLUTION

This is a continuation of International Application No. PCT/JP2013/003590, with an international filing date of Jun. 6, 2013, which claims the foreign priority of Japanese Patent Application No. 2012-134414, filed on Jun. 14, 2012, the entire contents of both of which are hereby incorporated by reference.

BACKGROUND OF THE INVENTION

1. Field of the Invention

The present disclosure relates to a method for treating a hexavalent chromium-containing aqueous solution.

2. Description of Related Art

In resent years, the use of a photocatalyst has been expected as means for treating water containing a predetermined pollutant. For example, Yuko Maruo and two other persons state that a medical drug contained in water can be decomposed and removed by a titanium dioxide photocatalyst ("Development of dispersion-type $TiO_2$ photocatalyst for decomposition of medical drugs in water", Book of Preprints of The 77th annual meeting of The Society of Chemical Engineers, Japan, Public Interest Incorporated Association The Society of Chemical Engineers, Japan, March 2012, p. 427). In addition, Limin Wang and two other persons state that hexavalent chromium can be reduced into trivalent chromium by photocatalytic reaction of titanium dioxide, and that the presence of coexisting organic substances and the surface area of the titanium dioxide influence the reduction rate ("Photocatalytic reduction of Cr(VI) over different $TiO_2$ photocatalysts and the effects of dissolved organic species", Journal of Hazardous Materials, Mar. 21, 2008, vol. 152, No. 1, p. 93-99). In addition, in order to facilitate solid-liquid separation of photocatalyst particles dispersed in water, it has been proposed to use a photocatalyst in which titanium dioxide particles are immobilized by a binder such as a binding agent on support particles having a larger particle diameter than the titanium dioxide particles (see JP 10-249210 A, for example). In addition, a technique has been proposed that uses a photocatalyst obtained by coating support particles with titanium dioxide by a coating process such as a sol-gel process (see JP 11-500660 T, for example).

SUMMARY OF THE INVENTION

Although the techniques proposed in JP 10-249210 A and JP 11-500660 T are suitable for solid-liquid separation of photocatalyst particles dispersed in water, the techniques may not provide sufficient photocatalytic activity.

In view of the above findings, one non-limiting and exemplary embodiment provides a method for treating a hexavalent chromium-containing aqueous solution by water treatment employing a titanium dioxide photocatalyst that is excellent in both photocatalytic activity and solid-liquid separation performance.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a method for treating a hexavalent chromium-containing aqueous solution, the method including: a step a of adding catalyst particles to the aqueous solution; a step b of reducing hexavalent chromium by irradiating the aqueous solution with light having a wavelength of 200 nanometers or more and 400 nanometers or less while stirring the catalyst particles in the aqueous solution; and a step c of stopping the stirring in the step b and separating the catalyst particles from the aqueous solution by sedimentation. Each catalyst particle is composed only of a titanium dioxide particle and a zeolite particle, the titanium dioxide particle is adsorbed on an outer surface of the zeolite particle, the zeolite particle includes silica and alumina at a silica/alumina molar ratio of 10 or more, and the catalyst particles are contained in the aqueous solution at a concentration of 0.4 grams/liter or more and 16 grams/liter or less.

According to the above method, it is possible to provide a method for treating a hexavalent chromium-containing aqueous solution by water treatment employing a titanium dioxide photocatalyst that is excellent in both photocatalytic activity and solid-liquid separation performance.

DETAILED DESCRIPTION

Figure 1A:
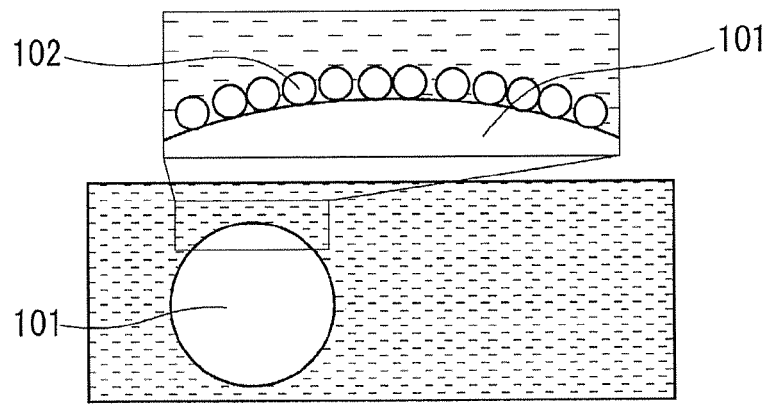
FIG. 1A is a diagram conceptually showing the structure of a titanium dioxide composite catalyst.

<Findings on which the Present Disclosure is Based>

Nowadays, pollution of drinking water or surface water by hexavalent chromium has been reported in various parts of the worlds. Hexavalent chromium is a substance that is extremely toxic for human bodies. The lethal dose of potassium dichromate, which is a representative hexavalent chromium compound, is 0.5 to 1 gram. In addition, since hexavalent chromium has carcinogenicity, mutagenicity etc., drinking hexavalent chromium-containing water continuously over a long period of time causes cancers etc. In view of such high hazardousness of hexavalent chromium, many countries strictly regulate the concentration of hexavalent chromium in drinking water and discharged water. For example, in Japan, it is stipulated that the standard value for hexavalent chromium in drinking water is 50 ppb or less and the standard value for hexavalent chromium in discharged water is 500 ppb or less.

However, hexavalent chromium is an indispensable substance for industry, and is used in various industrial fields such as plating industry, steel industry, and tannage industry.

In the natural environment, chromium is present in an oxidized trivalent or hexavalent form. In contrast to hexavalent chromium which is highly toxic, trivalent chromium has not been found to have toxicity, and is an essential trace metal element for human bodies. Also, trivalent chromium is exempt from the regulations for the concentration in discharged water and drinking water. Therefore, hexavalent chromium can be detoxified by being reduced into trivalent chromium.

As methods for reducing hexavalent chromium, methods using photocatalysts have been reported as well as methods using a chemical reagent serving as a reducing agent. Among them, a method using a titanium dioxide photocatalyst is expected as a sustainable treatment method since the method does not need an agent such as a chemical reagent and can use sunlight. The reduction of hexavalent chromium by a titanium dioxide photocatalyst is due to excited electrons generated by photocatalytic reaction of titanium dioxide. When titanium dioxide is irradiated with ultraviolet light, holes and electrons are generated. The holes react with water molecules to generate OH radicals, and the electrons generated simultaneously with the holes react with hexavalent chromium adsorbed on the surface of the titanium dioxide. As a result, the hexavalent chromium can be reduced into trivalent chromium.

As the types of the titanium dioxide photocatalyst supplied into a photoreactor in the water treatment method using the titanium dioxide photocatalyst, there can be mentioned: (I) an immobilized catalyst in the case of which nanometer-order titanium dioxide particles are used by being immobilized on a substrate with a binder or the like; and (II) a dispersed catalyst in the case of which nanometer-order titanium dioxide particles are used by being mixed with and suspended in water to be treated. In either case, the titanium dioxide photocatalyst is irradiated with UV (Ultraviolet) light for excitation of titanium dioxide in a state where an interface is formed between the water and the titanium dioxide photocatalyst. Of the two types of catalysts, the dispersed catalyst denoted by (II) is much more advantageous from the standpoint of efficiency of reduction of hexavalent chromium since the dispersed catalyst allows a larger surface area per unit mass to be obtained, and also allows a chemical substance to be diffused without any disturbance and to reach the surface of the titanium dioxide. In fact, when the performances of (I) and (II) are compared in terms of efficiency of reduction of hexavalent chromium in water, the dispersed catalyst denoted by (II) exhibits performance that is ten to one hundred times higher than that of the immobilized catalyst denoted by (I).

However, in a water treatment method using a dispersed catalyst, titanium dioxide particles are in a state of being dispersed in water after chromium in water is reduced by irradiation with UV light. If the titanium dioxide particles dispersed in water is separated from the treated water by solid-liquid separation, reuse of the titanium dioxide particles and discharge of the treated water are enabled. However, the titanium dioxide particles have a nanometer-order particle diameter, and therefore, the solid-liquid separation of the titanium dioxide particles dispersed in water is difficult. For example, when a separation means using a polymer filter is employed, clogging of the filter is caused by the titanium dioxide particles, and the flow rate of the treated water is thus decreased, which makes it difficult to perform continuous solid-liquid separation of the titanium dioxide particles. In addition, in the case of employing a natural sedimentation process using gravity, the sedimentation velocity of the titanium dioxide particles is extremely low due to the very small particle diameter of the titanium dioxide particles, and therefore, the solid-liquid separation of the titanium dioxide particles are not completed even when the treated water in which the titanium dioxide particle are dispersed is allowed to stand for 1 to 2 days. That is, despite its excellent performance in reduction of hexavalent chromium in water, the water treatment method using a dispersed catalyst has not been fully put into practical use since the step of the solid-liquid separation of the titanium dioxide particles acts as a rate-limiting step in the whole water treatment, and significantly hinders the efficiency of the water treatment.

When titanium dioxide particles having an over-nanometer diameter, for example, a diameter larger than 1 μm, are used as a catalyst, solid-liquid separation by sedimentation is enabled. However, titanium dioxide particles having a large particle diameter are smaller in surface area per unit mass than nanometer-order titanium dioxide particles. Moreover, when the diameter of the titanium dioxide particles is increased, the titanium dioxide makes a phase transition from an anatase crystal which has high photocatalytic activity to a rutile crystal which has low photocatalytic activity, with the result that sufficient photocatalytic activity is not obtained. For example, the techniques described in JP 10-249210 A and JP 11-500660 T have been proposed in order to realize a titanium dioxide particle photocatalyst that allows solid-liquid separation of titanium dioxide particles dispersed in water.

When titanium dioxide particles serving as a photocatalyst are immobilized by a binder on support particles having a larger particle diameter than the titanium dioxide particles, the titanium dioxide particles are firmly immobilized on the surfaces of the support particles. As a result, micrometer-order photocatalyst particles suitable for solid-liquid separation from water can be obtained. However, the immobilization by this method may decrease the photocatalytic activity of the titanium dioxide particles. In addition, a photocatalyst including support particles and titanium dioxide deposited on the support particles by a sol-gel process is indeed suitable for solid-liquid separation of the photocatalyst particles dispersed in water, but lacks sufficient photocatalytic activity, similarly to the photocatalyst in which titanium dioxide particles are immobilized by a binder on support particles having a larger particle diameter than the titanium dioxide particles.

<Description of Aspects of the Present Disclosure>

A first aspect of the present disclosure provides a method for treating a hexavalent chromium-containing aqueous solution, the method including: a step a of adding catalyst particles to the aqueous solution; a step b of reducing hexavalent chromium by irradiating the aqueous solution with light having a wavelength of 200 nanometers or more and 400 nanometers or less while stirring the catalyst particles in the aqueous solution; and a step c of stopping the stirring in the step b and separating the catalyst particles from the aqueous solution by sedimentation. Each catalyst particle is composed only of a titanium dioxide particle and a zeolite particle, the titanium dioxide particle is adsorbed on an outer surface of the zeolite particle, the zeolite particle includes silica and alumina at a silica/alumina molar ratio of 10 or more, and the catalyst particles are contained in the aqueous solution at a concentration of 0.4 grams/liter or more and 16 grams/liter or less.

According to the first aspect, each catalyst particle is composed only of titanium dioxide and a zeolite particle, and the titanium dioxide particle is adsorbed on the outer face of the zeolite particle. Therefore, almost the whole of a surface active site of the titanium dioxide particle can be effectively used. In addition, the terminal velocity of natural sedimentation of the catalyst particle is higher than that of a single zeolite particle or a single titanium dioxide particle, and thus excellent solid-liquid separation performance is exhibited.

A second aspect of the present disclosure provides the method as set forth in the first aspect, the method including a step d of adding again the catalyst particles separated by sedimentation in the step c to the aqueous solution after the step c, wherein the step b and the step c are performed again after the step d.

According to the second aspect, the separated catalyst particles can be reused.

A third aspect of the present disclosure provides the method as set forth in the first aspect, wherein the catalyst particles are separated by sedimentation in a solid-liquid separation vessel including a filtration membrane element in the step c, the method further includes a step e of producing treated water from the aqueous solution using the filtration membrane element, and the filtration membrane element used in the step e is composed of a plate-shaped frame and sheets of filter paper made of resin and attached to both faces of the frame, and is arranged parallel to a direction in which the catalyst particles are sedimented.

According to the third aspect, treated water can be produced using the filtration membrane element.

A fourth aspect of the present disclosure provides the method as set forth in the third aspect, the method including a step f of adding again the catalyst particles separated by sedimentation in the step c to the aqueous solution after the step c, wherein the step b, the step c and the step e are performed again after the step f.

According to the above aspect, the catalyst particles separated according to the third aspect can be reused.

A fifth aspect of the present disclosure provides the method as set forth in any one of the first to fourth aspects, wherein the zeolite particle is a zeolite particle subjected to a process in which an alumina portion is dissolved by treatment with an acid aqueous solution to introduce an active site for direct adsorption of the titanium dioxide particle, and then the acid aqueous solution adhered to the surface of the zeolite particle is removed by washing with water.

According to the fifth aspect, the alumina portion (Al portion) of the zeolite is dissolved, and an increased number of active sites for direct adsorption of titanium dioxide can be introduced into the basic skeleton of the zeolite.

Embodiments of the present disclosure will be described below with reference to the drawings. However, the present disclosure is not limited to the embodiments described below.

<First Embodiment>

Figure 1B:
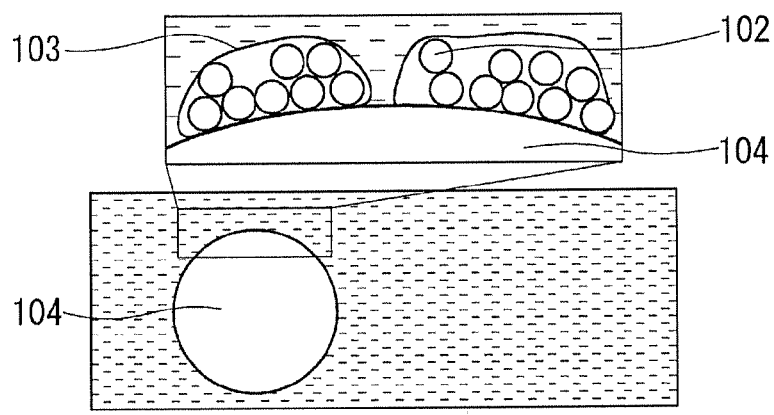
FIG. 1B is a diagram conceptually showing the structure of a catalyst obtained by a binder process.
Figure 1C:
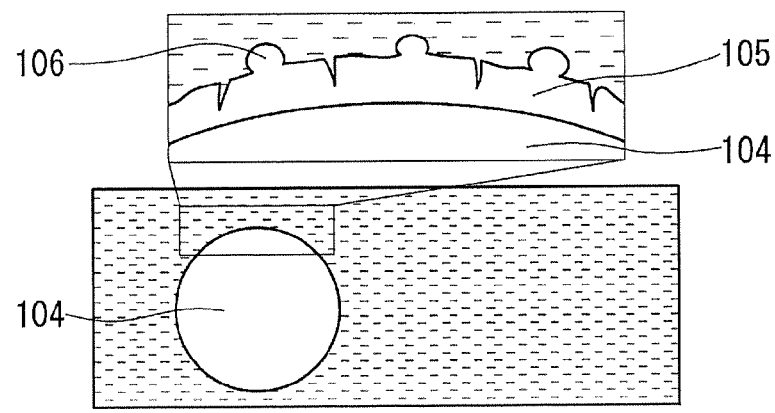
FIG. 1C is a diagram conceptually showing the structure of a catalyst obtained by a sol-gel process.

FIG. 1A conceptually shows the structure of a titanium dioxide composite catalyst used in a method of the present embodiment. The titanium dioxide composite catalyst of the present embodiment includes zeolite particles 101 having a micrometer-order particle diameter, and has a structure in which nanometer-order anatase-type titanium dioxide particles 102 are immobilized on the surfaces of the zeolite particles 101. The titanium dioxide composite catalyst is dispersed in water to be treated 107. That is, the titanium dioxide composite catalyst used in the method of the present embodiment is composed only of titanium dioxide particles and zeolite particles. FIG. 1B conceptually shows the structure of a catalyst in the case of which titanium dioxide particles are immobilized on a support particle 104 by a binder process which is a conventional technique, and FIG. 1C conceptually shows the structure of a catalyst in the case of which titanium dioxide is immobilized on the support particle 104 by a sol-gel process. In the case where the titanium dioxide particles 102 are immobilized on the support particle 104 using a thin film 103 formed of a binder agent as in FIG. 1B, a part of the surface active site specific to the titanium dioxide particle is covered with a thin film formed of $SiO_2$, $Al_2O_3$ or the like derived from a precursor substance. As a result, the titanium dioxide particles are inactivated, and their catalytic performance is deteriorated. In addition, in the case where support particles are coated with titanium dioxide by a sol-gel process, the catalyst has a structure in which, as shown in FIG. 1C, the surface of the support particle 104 is covered with a $TiO_2$ film 105 and a titanium dioxide deposit 106 is present on a part of the outer periphery of the $TiO_2$. Therefore, the substantial reactive surface area of the titanium dioxide serving as a catalyst is small. In the titanium dioxide composite catalyst used in the method of the present embodiment, as shown in FIG. 1A, the titanium dioxide particles 102 are immobilized directly on the zeolite particle 101 without the mediation of a thin film. Therefore, in the titanium dioxide composite catalyst used in the method of the present embodiment, almost the whole of the surface active site of the titanium dioxide particle can be effectively used, and photocatalytic activity comparable to that of a nanometer-order titanium dioxide particle can be ensured. Consequently, the photocatalytic activity of the titanium dioxide composite catalyst used in the method of the present embodiment is about 8 times higher than that of a photocatalyst prepared by the binder process or the sol-gel process. Here, the description "the titanium dioxide composite catalyst is composed only of titanium dioxide particles and zeolite particles" means that, as shown in FIG. 1A, the thin film 103 formed of a binder agent is not present on the outer surfaces of the zeolite particle 101 and the titanium dioxide 102, and the surface of the zeolite particle 101 is not covered with the $TiO_2$ thin film 105.

For example, zeolite particles and titanium dioxide particles are mixed at a predetermined weight ratio in pure water or nearly-pure water, the mixed liquid is then immediately subjected to ultrasonic dispersion treatment to allow the titanium dioxide particles to be adsorbed on the surfaces of the zeolite particles, and thus the titanium dioxide particles are immobilized directly on the surfaces of the zeolite particles. The purpose of the ultrasonic treatment is to forcibly disperse the titanium dioxide particles intrinsically forming aggregations each consisting of several hundred particles in water, and thereby to facilitate the immobilization of the titanium dioxide particles on the surfaces of the zeolite particles. The time for the ultrasonic dispersion treatment is desirably about 1 hour. Once the titanium dioxide particles have been adsorbed and immobilized on the surfaces of the zeolite particles, the titanium dioxide particles cannot easily been separated from the surfaces of the zeolite particles in water because of the electrostatic attractive force between the titanium dioxide particles and the zeolite particles.

The above titanium dioxide composite catalyst may be synthesized in hexavalent chromium-containing water to be treated. However, synthesizing the titanium dioxide composite catalyst in pure water or nearly-pure water in advance yields more reproducible results. In order to immobilize the titanium dioxide particles on the surfaces of the zeolite particles, it is desirable to preliminarily subject the zeolite particles to activation treatment with an acid aqueous solution before mixing the zeolite particles and the titanium dioxide particles. Zeolite has a basic skeleton composed of silica and alumina. From another standpoint, it can be said that zeolite includes $(SiO_4)^{4-}$ and $(AlO_4)^{5-}$ as basic units. The aforementioned treatment with an acid aqueous solution dissolves only the alumina portions (Al portions) of the zeolite, and accordingly, an increased number of active sites for direct adsorption of titanium dioxide can be introduced into the basic skeleton of the zeolite. The zeolite particles having such active sites can adsorb and immobilize an increased number of the titanium dioxide particles on the surfaces thereof. However, an acid solvent weakens the electrostatic attractive force between the titanium dioxide particles and the zeolite particles. Therefore, the activation treatment of the zeolite particles with an acid aqueous solution is desirably performed before synthesis of the titanium dioxide composite catalyst.

Figure 2:
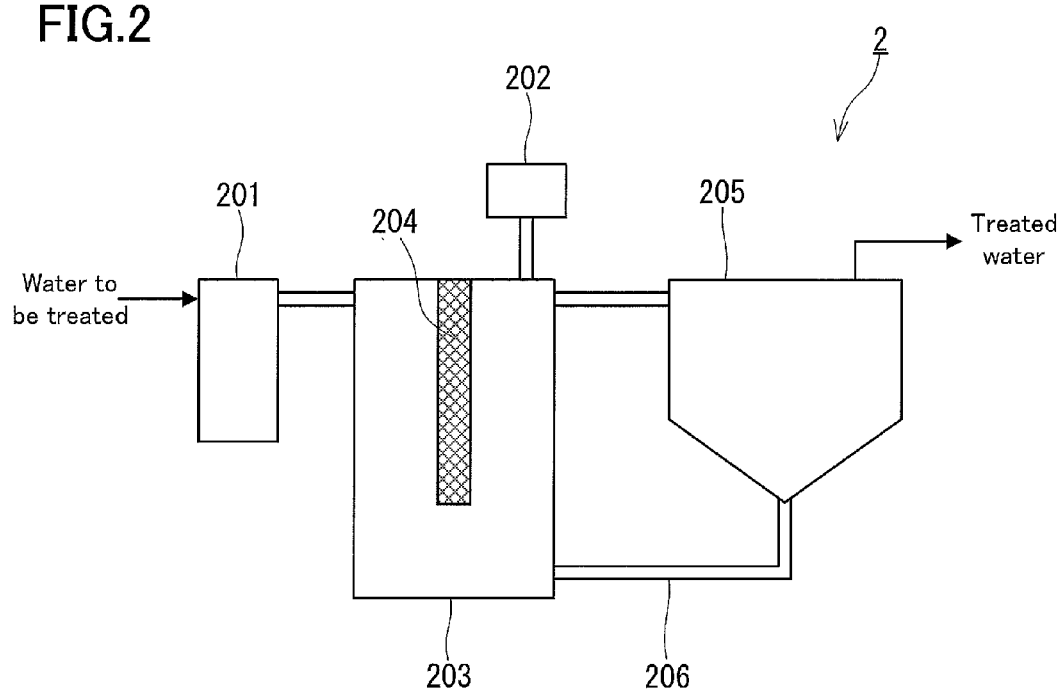
FIG. 2 is a diagram conceptually showing the configuration of a water treatment system of a first embodiment.

FIG. 2 schematically shows an embodiment of a water treatment system 2 of the present embodiment. The water treatment system 2 includes a pre-filtration vessel 201, a slurry tank 202, a photoreactor 203, a light source 204 provided inside the photoreactor 203, a solid-liquid separation vessel 205, and a returning part 206. The method of the present embodiment includes a catalyst adding step (step a1), a photoreaction step (step b1), and a sedimentation separation step (step c1). The method includes a re-adding step (step d1) as necessary. Hereinafter, each of the steps will be described.

<Catalyst Adding Step (Step a1)>

The most distinctive feature of the method of the present embodiment is that the titanium dioxide composite catalyst is irradiated with excitation light in a state where the titanium dioxide composite catalyst is uniformly dispersed in water to be treated.

A slurry liquid containing the titanium dioxide composite catalyst is supplied from the slurry tank 202. That is, the titanium dioxide composite catalyst is added to a hexavalent chromium-containing aqueous solution held in the photoreactor 203. As a result, the titanium dioxide composite catalyst can be dispersed in the hexavalent chromium-containing aqueous solution in the photoreactor 203. In order to prevent precipitation of the titanium dioxide composite catalyst, it is desirable to stir gently the aqueous solution in the photoreactor 203.

The concentration of the titanium dioxide composite catalyst in the water in the photoreactor 203 is desirably 0.4 g/L or more and 16 g/L or less. When the concentration of the titanium dioxide composite catalyst in the water is more than 16 g/L, the entry of the below-described UV light into the water is significantly disturbed, and the hexavalent chromium reduction ratio is accordingly decreased. On the other hand, when the concentration of the titanium dioxide composite catalyst in the water is less than 0.1 g/L, the amount of the titanium dioxide composite catalyst is insufficient with respect to the amount of UV light, which decreases the hexavalent chromium reduction ratio.

<Photoreaction Step (Step b1)>

UV light is applied from the light source 204. Upon the irradiation with the UV light, hexavalent chromium contained in the aqueous solution is reduced by the catalytic action of the titanium dioxide composite catalyst. The wavelength of the light from the light source 204 is 200 nm or more and 400 nm or less. The UV light from the light source 204 may be monochromatic light or continuous light as long as its wavelength is within the above range. The shorter the wavelength of the light applied to the titanium dioxide photocatalyst is, the higher the efficiency of generation of excited electrons is. Therefore, a shorter wavelength of the light from the light source 204 is desirable from the standpoint of the reduction ratio of hexavalent chromium contained in the aqueous solution. Examples of the light source that can be used in the photoreaction step include a low pressure mercury lamp, a medium pressure mercury lamp, a high pressure mercury lamp, an excimer lamp, a xenon lamp, sunlight, black light, and an LED. Also in the present step, it is desirable to stir gently the aqueous solution held in the photoreactor 203.

The photoreactor 203 is either a batch-type reactor or a continuous-type reactor. Examples of the batch-type reactor include a batch reactor and a batch recirculation reactor. Examples of the continuous-type reactor include a stirred tank reactor and a tubular reactor. When an inorganic compound such as mud and sand which is derived from silicas is contained in the water to be treated, it is desirable to preliminarily separate and remove the inorganic compound in the pre-filtration vessel 201.

<Sedimentation Separation Step (Step c1)>

After the photoreaction step, the aqueous solution containing the dispersed titanium dioxide composite catalyst is transferred from the photoreactor 203 to the solid-liquid separation vessel 205. Accordingly, the stirring of the aqueous solution in the step b1 is stopped. In the solid-liquid separation vessel 205, the titanium dioxide composite catalyst in the aqueous solution is separated from the aqueous solution by sedimentation, and a concentrate of the titanium dioxide composite catalyst and treated water are produced. By making use of the fact that the titanium dioxide composite catalyst readily sediments, the titanium dioxide composite catalyst is separated by sedimentation in the aqueous solution. Examples of the process for sedimentation separation include a gravitational sedimentation process, a centrifugal sedimentation process, and a liquid cyclone process. When hexavalent chromium is reduced, trivalent chromium is produced. The solubility of trivalent chromium is lower than the solubility of hexavalent chromium. Therefore, trivalent chromium can be removed from treated water relatively easily by being precipitated in the treated water.

In the case of separation using a gravitational sedimentation process, the aqueous solution containing the titanium dioxide composite catalyst is allowed to stand in the solid-liquid separation vessel 205. The titanium dioxide composite catalyst naturally sediments under the action of gravity. Therefore, a concentrate (slurry liquid) containing the concentrated titanium dioxide composite catalyst can be obtained in the lower portion of the solid-liquid separation vessel 205, while treated water that is a supernatant liquid free from the titanium dioxide composite catalyst can be obtained in the upper portion of the solid-liquid separation vessel 205. The time for which the aqueous solution is allowed to stand is, for example, 10 minutes or longer. The concentrate (slurry liquid) of the titanium dioxide composite catalyst is returned to the photoreactor 203 via the returning part 206, and can be reused in the photoreaction step.

In the case of separation using a centrifugal sedimentation process, the treated water containing the titanium dioxide composite catalyst is whirled in a holeless rotating container to separate the titanium dioxide composite catalyst. Only the titanium dioxide composite catalyst is moved toward the wall of the container by a centrifugal force, and is concentrated. Thus, the treaded water and the concentrate of the catalyst are separated from each other. The centrifugal force acting on the rotating container is, for example, 60 G or more.

<Re-Adding Step (Step d1)>

The concentrate of the titanium dioxide composite catalyst, which has been produced in the sedimentation separation step, is returned to the photoreactor 203 through the returning part 206. That is, the titanium dioxide composite catalyst separated in the sedimentation separation step is added again to the hexavalent chromium-containing aqueous solution. In order to reliably reduce hexavalent chromium in the photoreactor 203, the concentrate of the titanium dioxide composite catalyst needs to be continuously added to the to-be-treated water continuously flowing into the photoreactor through the pre-filtration vessel 201. As the concentrate of the titanium dioxide composite catalyst, the concentrate produced in the solid-liquid separation vessel 205 can be reused. That is, in the present embodiment, the step b1 and the step c1 may be further performed after the step d1. The titanium dioxide composite catalyst can be reused as long as the surface active sites of the titanium dioxide are not covered with scale or hardly-decomposable thin films derived from organic or inorganic substances.

<Sedimentation Separation Performance>

In the sedimentation separation step, the catalytic particles are required to have the capability to be separated, for example, by a gravitational sedimentation process in a short time. This capability can be evaluated, for example, by a light transmission method. The light transmission method is an evaluation technique in which the change over time in light transmittance is monitored for a suspension of a catalyst by continuously measuring the transmittance of laser light with which the suspension is irradiated. For a suspension of a catalyst that has a high sedimentation velocity, a significant change in transmittance is observed within a short time since the catalyst sediments in a short time. By contrast, for a substance that has a low sedimentation velocity, almost no change in transmittance is observed even after a lapse of time.

Figure 3:
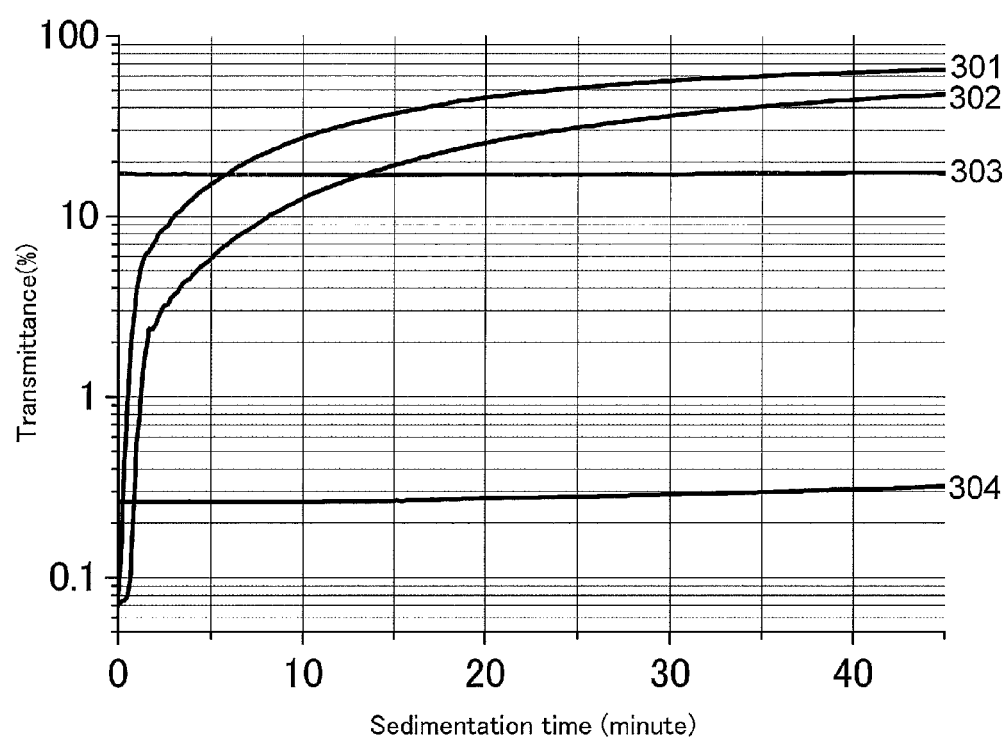
FIG. 3 is a diagram showing results of experiments for evaluating the natural sedimentation velocity of particles.

To exemplify the excellent sedimentation separation performance of the titanium dioxide composite catalyst particles used in the present embodiment, FIG. 3 shows how natural sedimentation proceeded for the cases of the titanium dioxide composite catalyst particles, titanium dioxide particles (P25 manufactured by Degussa AG), and zeolite particles (HY type). In FIG. 3, the horizontal axis represents the elapsed time from injection of a specimen liquid into a sample, and the vertical axis represents the light transmittance. The concentration of the titanium dioxide composite catalyst particles in a specimen liquid was 3.6 g/L. The concentration of the titanium dioxide particles in a specimen liquid was 0.9 g/L. The concentration of the zeolite particles in a specimen liquid was 2.7 g/L. The concentration of the titanium dioxide particles and the concentration of the zeolite particles were respectively set equal to the concentrations of the titanium dioxide particles and the zeolite particles included in the titanium dioxide composite catalyst particles. As the titanium dioxide composite catalyst particles, the following two types of catalysts were prepared: a catalyst A for which zeolite particles (having a silica/alumina molar ratio of 30 and a Si/Al molar ratio of 15) were used that had been treated by being immersed in a 0.1 mol/L hydrochloric acid aqueous solution and then stirred with an ultrasonic washer for 60 minutes; and a catalyst B for which zeolite particles were used that had been treated by being stirred with an ultrasonic washer for 60 minutes without immersion in a hydrochloric acid aqueous solution.

In FIG. 3, the numeral 301 denotes the result for the catalyst A, the numeral 302 denotes the result for the catalyst B, the numeral 303 denotes the result for the titanium dioxide particles alone, and the numeral 304 denotes the result for the zeolite particles alone. The progress of the sedimentation of the titanium dioxide composite catalyst was confirmed from the increase over time in transmittance. For comparison of sedimentation performance, the amount of change in transmittance during the sedimentation time of 30 minutes was calculated for each specimen. The transmittance change in the titanium dioxide particle specimen was 0%, and the transmittance change in the zeolite particle specimen was 0.026%. That is, there was almost no increase in transmittance even after 30 minutes elapsed from injection of the specimen liquid into the sample cell. It can be said that these particles hardly sediment in 30 minutes. On the other hand, the transmittance change in the catalyst A specimen was 56%, and the transmittance change in the catalyst B specimen was 36%. This indicates that, regardless of whether or not the zeolite particles are subjected to the acid treatment, both the catalyst A and the catalyst B can be separated by sedimentation from the aqueous solution in a practical time of about 30 minutes to an extent sufficient to allow water discharge (transmittance change of 20% or more).

The proportion (sedimentation amount) of the catalyst particles that sedimented in 30 minutes after injection of the specimen liquid into the sample was calculated from the transmittance change. In the catalyst A specimen, 92% of the particles sedimented. In the catalyst B specimen, 86% of the particles sedimented. That is, both the catalyst A and the catalyst B can be separated by sedimentation in a practical time of about 30 minutes. By contrast, only 1.6% of the particles sedimented in the zeolite particle specimen, and the particles did not sedimented at all in the titanium dioxide particle specimen.

When a spherical particle sediments freely in a fluid under the action of gravity, the sedimentation velocity of the spherical particle is proportional to the difference in specific gravity between the particle and water, and to the square value of the particle diameter. In the titanium dioxide composite catalyst of the present embodiment, the zeolite particles have a micrometer-order particle diameter (of 1 μm to 10 μm, for example), and the titanium dioxide particles whose specific gravity differs from water by an amount that is 100 or more times larger than the difference in specific gravity between the zeolite particle and water are densely immobilized on the outer surfaces of the zeolite particles. Therefore, the particle diameter of the titanium dioxide composite catalyst is about three orders of magnitude larger than that of a nanometer-order titanium dioxide particle, and the difference in specific gravity between the titanium dioxide composite catalyst and water is about two orders of magnitude larger than the difference in specific gravity between the zeolite particle and water. These two facts are thought of as reasons why the titanium dioxide composite catalyst exhibits a sedimentation velocity that is considerably higher than those of the zeolite particles and the titanium dioxide particles.

The zeolite particle used in the present embodiment is a porous inorganic compound having a basic skeleton composed of silica and alumina. From another standpoint, it can be said that the zeolite particle used in the present embodiment is a porous inorganic compound that includes $(SiO_4)^{4-}$ and $(AlO_4)^{5-}$ as basic units. The sedimentation performance of the catalyst particles, which is key to the sedimentation separation step of the present embodiment, is influenced by the ratio between silica and alumina which compose the zeolite. Here, the silica/alumina molar ratio between silica and alumina which compose the zeolite is twice the ratio between $(SiO_4)^{4-}$ and $(AlO_4)^{5-}$ in the zeolite, that is, the Si/Al molar ratio. The sedimentation performance of the titanium dioxide composite catalyst in the sedimentation separation step of the present embodiment is influenced by the ratio between silica and alumina which compose the zeolite. Table 1 shows the transmittance change during the sedimentation time of 30 minutes and the proportion (sedimentation amount) of the sedimented catalyst particles for titanium dioxide composite catalysts synthesized using zeolite particles having different silica/alumina molar ratios.

TABLE 1

| Silica/alumina molar ratio | 5 | 10 | 30 | 60 | 770 |
|---|---|---|---|---|---|
| Si/Al molar ratio | 2.5 | 5 | 15 | 30 | 385 |
| Transmittance change [%] | 1.6 | 20 | 36 | 46 | 61 |
| Sedimentation amount [%] | 43.6 | 80.0 | 85.9 | 88.9 | 93.2 |

As shown in the table, when the zeolite particles have a silica/alumina molar ratio of 10 or more (a Si/Al molar ratio of 5 or more), the titanium dioxide composite catalyst can be sedimented in a practical time of about 30 minutes to an extent sufficient to allow water discharge (transmittance change of 20% or more). The titanium dioxide particles can be stably immobilized only when zeolite particles having a silica/alumina ratio of 10 or more are used as a support material. The reason is that the below-described adhesion is more likely to occur between the titanium dioxide particles and the zeolite. Therefore, the titanium dioxide particles can be used in water for a long period of time without desorption from the zeolite particles. The crystal system of the zeolite particles serving as a support material is not particularly limited. For example, zeolite particles of a common type, such as faujasite-type particles and MFI-type particles, can be used.

In the titanium dioxide composite catalyst of the present embodiment, strong adhesions derived from electrostatic attractive force exist between the titanium dioxide particles and the zeolite particles. Therefore, the titanium dioxide composite catalyst of the present embodiment has high durability, and many of the titanium dioxide particles remain immobilized on the zeolite particles even after, for example, a lapse of several months. On the other hand, for example, when an inorganic material such as silica particles and alumina particles, or an inorganic porous body such as brick and concrete is used as a support material, no strong adhesion occurs between the support material and the titanium dioxide particles. In such a case, when the catalyst is stirred together with the aqueous solution in a photoreactor, many of the titanium dioxide particles are disadvantageously desorbed from the support material in a short time.

In the present embodiment, particles of a nanometer-order size that have an anatase crystal system and a photocatalytic function, such as P25 manufactured by Degussa AG, Germany, can be used as the titanium dioxide particles immobilized on the zeolite particles. Particularly when the titanium dioxide particles have an average particle diameter in the range of 1 nm to 100 nm, a suitable titanium dioxide composite catalyst can be formed. The average particle diameter is defined as an average value of the long diameter and the short diameter of the titanium dioxide particle. When the average particle diameter of the titanium dioxide particle is less than 1 nm, the catalyst activity is decreased due to quantum size effect. In addition, when the average particle diameter of the titanium dioxide particle is more than 100 nm, the gravity acting on the titanium dioxide particle is larger than the force acting between the titanium dioxide particle and the zeolite particle. For this reason, immobilization of the titanium dioxide particle on the zeolite particle is unstable, and the titanium dioxide particle can easily desorb from the zeolite particle. Accordingly, the reproducibility of the titanium dioxide composite catalyst is deteriorated. The particle diameter distribution of the titanium dioxide particles of the titanium dioxide composite catalyst of the present embodiment was measured using a TEM (transmission electron microscope) image. As a result, it was confirmed that the particle diameters of the titanium dioxide particles of the present embodiment were distributed in the range of 25.8±24.6 nm, and were within the aforementioned limits. The error is a standard deviation at 99% confidence limit.

In the method of the present embodiment, electrons generated on the surface of the titanium dioxide under irradiation with UV light serve to reduce hexavalent chromium. When hexavalent chromium is reduced, the valence is decreased one by one due to electrons generated by photochemical reaction of titanium dioxide. That is, hexavalent chromium is reduced first into pentavalent form, then into tetravalent form, and finally into trivalent form.

<Second Embodiment>

A method of a second embodiment will be described with reference to FIG. 4. The second embodiment is the same as the first embodiment, except for the matters particularly described below.

Figure 4:
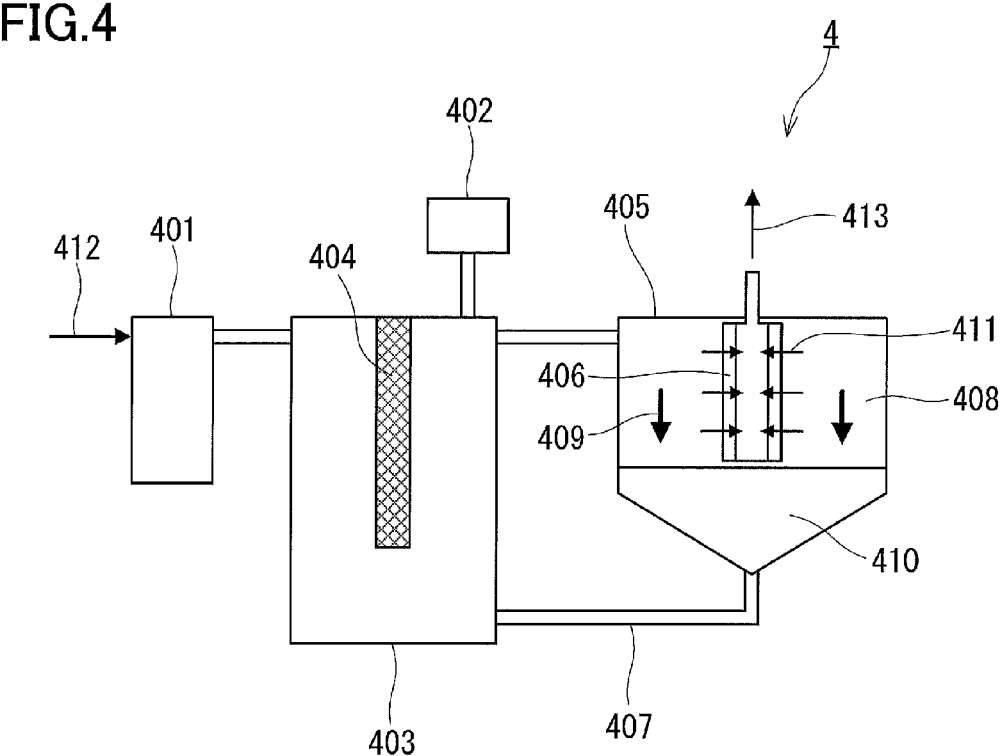
FIG. 4 is a diagram conceptually showing the configuration of a water treatment system of a second embodiment.

FIG. 4 conceptually shows a water treatment system for implementing the method of the present embodiment. The water treatment system 4 of the present embodiment includes a pre-filtration vessel 401, a slurry tank 402, a photoreactor 403, a light source 404 provided inside the photoreactor 403, a solid-liquid separation vessel 405, a filtration membrane element 406 provided inside the solid-liquid separation vessel 405, and a returning part 407. The method of the present embodiment includes a catalyst adding step (step a2), a photoreaction step (step b2), and a sedimentation separation step (step c2). The method includes a re-adding step (step d2) as necessary, and further includes a filtration step (step e2). Hereinafter, each of the steps will be described.

<Catalyst Adding Step (Step a2)>

The catalyst adding step (step a2) of the present embodiment is performed in the same manner as the catalyst adding step (step a1) of the first embodiment. Therefore, a detailed description thereof is omitted.

<Photoreaction Step (Step b2)>

The photoreaction step (step b2) of the present embodiment is performed in the same manner as the photoreaction step (step b1) of the first embodiment. Therefore, a detailed description thereof is omitted.

<Sedimentation Separation Step (Step c2)>

The aqueous solution treated in the step b2 is fed to the solid-liquid separation vessel 405, and is allowed to stand. Accordingly, the stirring of the aqueous solution in the step b2 is stopped. The titanium dioxide composite catalyst sediments in the aqueous solution being allowed to stand, and a layer 410 of the precipitated titanium dioxide composite catalyst is formed in the lower portion of the solid-liquid separation vessel 405. The layer 410 of the precipitated titanium dioxide composite catalyst is separated from a mixed liquid 408 of the water to be treated and the titanium dioxide composite catalyst, and thus a concentrated slurry is obtained. The titanium dioxide composite catalyst in the concentrated slurry includes the titanium dioxide composite catalyst originally dispersed in the aqueous solution and the catalyst particles that have not passed through the filtration membrane element 406 in the filtration step (step e2) described below. The proportion of the catalyst recovered in the form of the concentrated slurry is, for example, 99.99% or more. The performance evaluation and theoretical consideration for the sedimentation of the titanium dioxide composite catalyst of the present embodiment are the same as described for the first embodiment.

<Filtration Step (Step e2)>

Microfiltration using the filtration membrane element 406 is performed simultaneously with the sedimentation of the catalyst particles in the step c2, so as to produce treated water 413 from the mixed liquid 408 of the water to be treated and the catalyst particles. The concentration of the titanium dioxide composite catalyst remaining in the treated water produced is, for example, 10 ppm or less.

Figure 5:
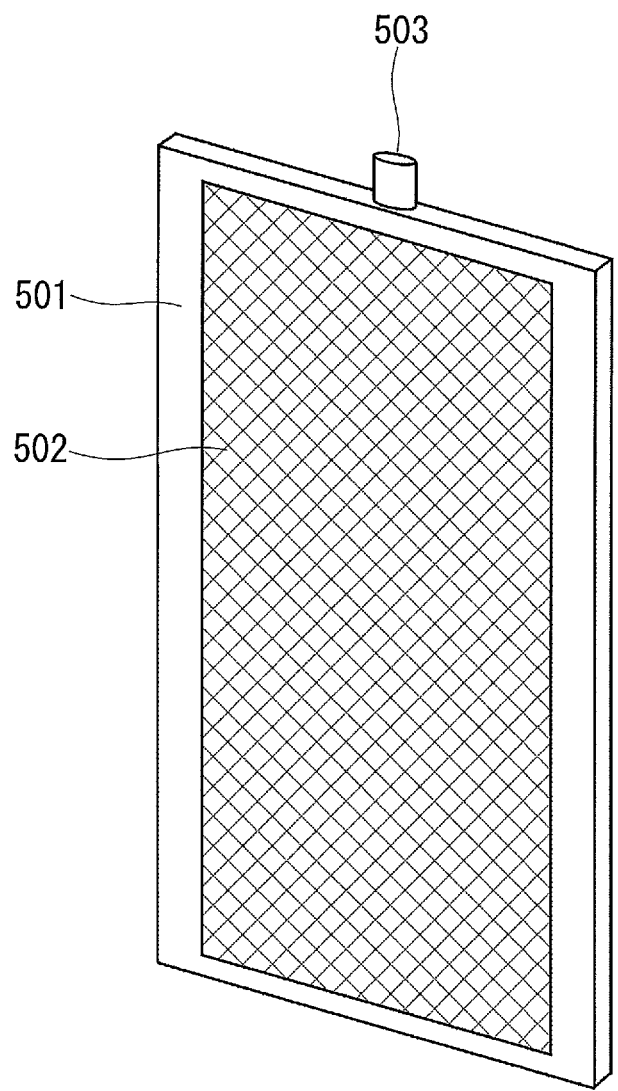
FIG. 5 is a perspective view schematically showing the structure of a filtration membrane element.

FIG. 5 is a perspective view schematically showing the structure of the filtration membrane element 406. The filtration membrane element 406 includes a plate-shaped frame 501 and sheets of filter paper 502 made of synthetic resin and attached fixedly to both faces of the frame 501. Filtration is performed by drawing water through a filtered water extraction port 503 using a pump (not shown). The water to be filtered passes through the filter paper 502 made of synthetic resin, enters the inside of the frame 501, and is discharged as the treated water 413 through the filtered water extraction port 503.

As shown in FIG. 4, the filtration membrane element 406 is arranged parallel to a sedimentation direction 409 in which the titanium dioxide composite catalyst is sedimented. A layer of deposited catalyst particles, which is called a cake layer, is usually formed on the surface of the filtration membrane element 406 along with the progress of the filtration. This cake layer peels off from the surface of the filtration membrane element 406 due to its own weight, and sediments to the lower portion of the solid-liquid separation vessel 405. The performance evaluation in terms of microfiltration for the titanium dioxide composite catalyst used in the present embodiment will be described later.

As described above, when hexavalent chromium is reduced, trivalent chromium is produced. The solubility of trivalent chromium is lower than the solubility of hexavalent chromium. For this reason, trivalent chromium is more readily precipitated in the treated water. Therefore, trivalent chromium can be removed using the filtration membrane element 406.

<Re-Adding Step (Step f2)>

The re-adding step (step f2) of the second embodiment is performed in the same manner as the re-adding step (step d1) of the first embodiment. The concentrated slurry of the titanium dioxide composite catalyst separated in the step c2 is returned to the photoreactor 403 through the returning part 407. That is, the titanium dioxide composite catalyst separated in the sedimentation separation step is added again to the hexavalent chromium-containing aqueous solution. The titanium dioxide composite catalyst particles can be repeatedly reused as long as the surface active sites of the titanium dioxide are not covered with scale or hardly-decomposable thin films derived from organic or inorganic substances. That is, in the present embodiment, the step b2, the step c2 and the step e2 may be further performed after the step f2.

Figure 6:
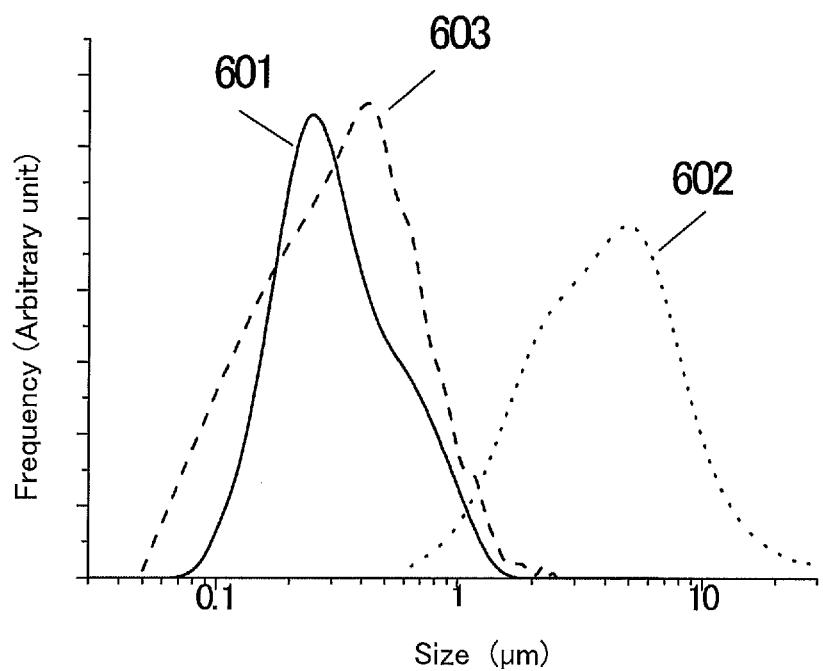
FIG. 6 shows graphs representing the particle size distribution of titanium dioxide particles and the particle size distribution of catalyst particles of an embodiment of the present disclosure.

The performance of the titanium dioxide composite catalyst of the present embodiment in terms of microfiltration will be described. In order to separate the titanium dioxide composite catalyst by microfiltration, the particle diameter of the titanium dioxide composite catalyst needs to be sufficiently larger than the pore diameter of the filtration membrane element. A larger difference between the particle diameter of the titanium dioxide composite catalyst and the pore diameter of the filtration membrane element allows the titanium dioxide composite catalyst to be separated in a shorter time with a lower probability of clogging of the filtration membrane element. FIG. 6 shows the results of particle size distribution measurements performed on titanium dioxide particles and on the titanium dioxide composite catalyst of the present embodiment. The numeral 601 denotes the result of the particle size distribution measurement on the titanium dioxide particles, and the numeral 602 denotes the result of the particle size distribution measurement on the titanium dioxide composite catalyst of the present embodiment. The average particle diameter of the titanium dioxide composite catalyst was 5.5 µm. The average pore diameter of the resin filtration membrane element used for the microfiltration in the above filtration step (step e2) was 0.42 µm. The average particle diameter of the titanium dioxide particles was 0.2 µm.

EXAMPLES

Example 1

Figure 7A:
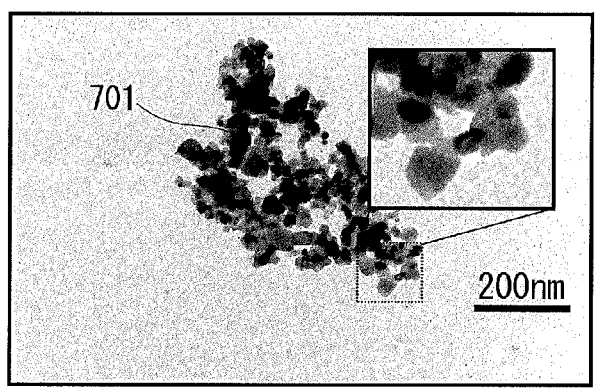
FIG. 7A is a photograph of a transmission electron microscope image of titanium dioxide particles alone.
Figure 7B:
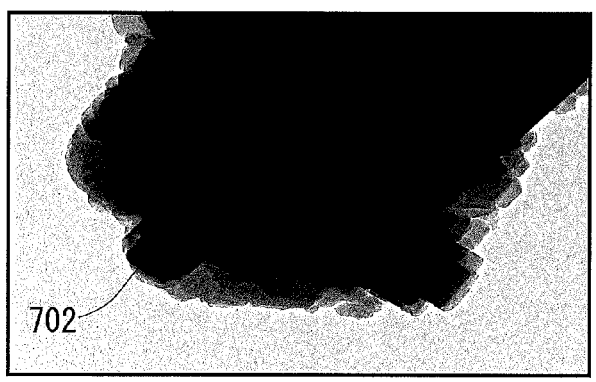
FIG. 7B is a photograph of a transmission electron microscope image of zeolite particles alone.
Figure 7C:
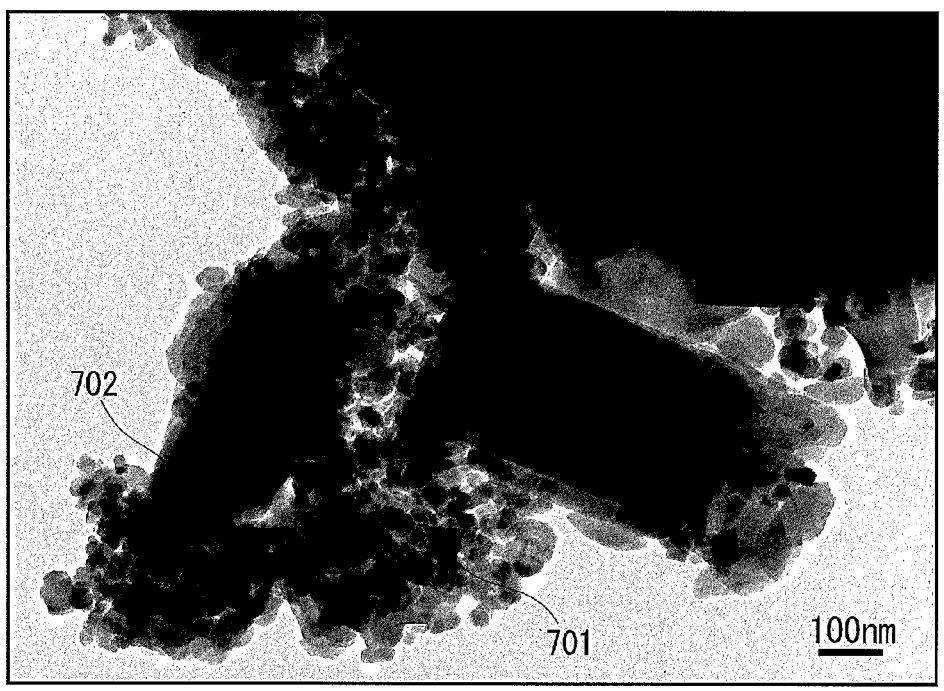
FIG. 7C is a photograph of a transmission electron microscope image of a titanium dioxide composite catalyst of an embodiment of the present disclosure.

First, a titanium dioxide composite catalyst was produced by the procedure described below. The zeolite particles used were HY-type zeolite particles (faujasite-type particles manufactured by Zeolyst) having an average particle diameter of 5.0 µm and a silica/alumina molar ratio of 30 (Si/Al molar ratio of 15). The zeolite particles were immersed in a 0.1 mol/L hydrochloric acid aqueous solution, and stirred in an ultrasonic washer for 60 minutes. Subsequently, only the zeolite particles were separated and recovered from the water by suction filtration. The resultant powder was sufficiently rinsed with water three times to wash off the acid, and was then dried. An amount of 0.9 g/L of titanium dioxide particles (P25 manufactured by Degussa AG) and 2.7 g/L of the HY-type zeolite particles treated with the hydrochloric acid aqueous solution were added to pure water prepared by an ultrapure water production apparatus. This solution was subjected to ultrasonic treatment using an ultrasonic generator for 1 hour. Thereafter, the solution was stirred with a magnetic stirrer at a number of revolutions of 300 rpm for 60 minutes to obtain a slurry liquid containing a titanium dioxide composite catalyst. A transmission electron microscope (TEM) image of the thus-fabricated titanium dioxide composite catalyst is shown in FIG. 7C. For comparison, a TEM image of the titanium dioxide particles alone is shown in FIG. 7A, and a TEM image of the zeolite particles alone is shown in FIG. 7B. It can be understood that, in the titanium dioxide composite catalyst 703, the titanium dioxide particles 701 are immobilized directly on the zeolite particle 702 without the mediation of a thin film.

The treatment system shown in FIG. 2 was constructed using the slurry liquid of the titanium dioxide composite catalyst fabricated as described above. The slurry of the titanium dioxide composite catalyst was loaded into the slurry tank 202, and was supplied to the photoreactor 203. An aqueous solution having dissolved therein $K_2Cr_2O_7$, which is a hexavalent chromium compound, was used as the water to be treated. The hexavalent chromium compound was dissolved in pure water at an aqueous solution concentration of 1000 μg/L, and the resultant solution was then introduced into the photoreactor 203. The slurry liquid of the titanium dioxide composite catalyst was supplied to the photoreactor so that the concentration of the catalyst was 0.4 g/L. Thereafter, UV light irradiation was performed in conjunction with stirring at 200 rpm. The light source 204 was composed of a combination of a xenon light source (MAX 302 manufactured by Asahi Spectra Co., Ltd.) and a band-pass filter. The light had a wavelength λ of 350 nm, a bandwidth of about 10 nm, and an intensity of 1 mW/cm$^2$.

The solution having been subjected to the light irradiation was collected, and the concentrations of substances in the solution were quantitatively analyzed by HPLC/ICP•MS. The hexavalent chromium reduction ratio achieved by irradiation for 8 minutes was 78.0%. Thus, it was confirmed that the titanium dioxide composite catalyst is effective for reduction of hexavalent chromium, that is, detoxification of hexavalent chromium.

The aqueous solution having undergone the photoreaction step and containing the suspended titanium dioxide composite catalyst was introduced to the solid-liquid separation vessel 205, and evaluation of gravitational sedimentation was performed by a light transmission method. A HeNe laser (632.8 nm, 3 mW, nonpolarized) was used as the light source. A fiber coupler including an objective lens was used, laser light was introduced into the fiber, and thus the solid-liquid separation vessel 205 containing the suspension was irradiated with the light. The light having transmitted through the solid-liquid separation vessel 205 was introduced again into the fiber, and finally, a light-receiving surface of a photodiode (C10439-03 manufactured by Hamamatsu Photonics K.K.) was irradiated with the light to measure the transmittance. The transmittance change after the titanium dioxide composite catalyst was sedimented for 30 minutes was 30±5%. This value of the transmittance change is beyond 20% which is a baseline for determining that the treated water is allowed to be discharged. Thus, it was confirmed that solid-liquid separation of the titanium dioxide composite catalyst from an aqueous solution in which the titanium dioxide composite catalyst is suspended can be achieved in a short time by sedimentation separation. The titanium dioxide composite catalyst separated and recovered was able to be continuously reused by being introduced again to the photoreactor 203 through the returning part 206.

As described above, according to Example 1, a water treatment method excellent in both photocatalytic activity and solid-liquid separation performance was achieved.

Example 2

A water treatment system for treating a hexavalent chromium-containing aqueous solution was constructed by the same way as in Example 1. A 1000 μg/L hexavalent chromium aqueous solution was used as the water to be treated. The amount of the titanium dioxide composite catalyst slurry supplied was adjusted to prepare five aqueous solutions containing the titanium dioxide composite catalyst at different concentrations, and the hexavalent chromium reduction ratio and the sedimentation performance were evaluated for each solution. The concentration of the titanium dioxide composite catalyst was set to 0.04 g/L for a solution A1, 0.4 g/L for a solution B1, 3.6 g/L for a solution C1, 16 g/L for a solution D1, and 40 g/L for a solution E1. UV light irradiation was performed under the same conditions as in Example 1, and the hexavalent chromium reduction ratio achieved after 8 minutes was evaluated. Furthermore, as in Example 1, the aqueous solution having undergone the photoreaction step and containing the suspended titanium dioxide composite catalyst was introduced to the solid-liquid separation vessel 205, and the light transmittance change after 30 minutes was evaluated as the sedimentation performance. The hexavalent chromium reduction ratios in the solutions having catalyst concentrations of 0.4 g/L, 3.6 g/L, and 16 g/L were 78.0%, 77.8%, and 74.3%, respectively, which revealed that high reduction ratios are achieved in these solutions. However, the hexavalent chromium reduction ratios in the solutions having catalyst concentrations of 0.04 g/L and 40 g/L were 11.2% and 13.0%, respectively, and were smaller than ⅕ of the reduction ratio in the solution having a catalyst concentration of 3.6 g/L. That is, in the treatment method of the present example, the suitable concentration of the titanium dioxide composite catalyst was in the range of 0.4 g/L to 16 g/L.

Comparative Examples

For comparison, a catalyst composed of quarts beads and titanium dioxide particles immobilized by a binder on the quarts beads was fabricated, and was evaluated for the hexavalent chromium reduction ratio and the sedimentation performance. Amorphous silica, which is commonly used, was used as the binder. An amount of 10 g of P25 which is titanium dioxide manufactured by Degussa AG, 8.7 g of TEOS (tetraethoxysilane) as silica alkoxide, 20 g of ethanol, and 50 g of a hydrochloric acid aqueous solution with a concentration of 1 mol/L, were mixed in a beaker, and then the mixture was immediately cooled in an ice bath while being stirred with a magnetic stirrer for 30 minutes. Evaluation was performed using this mixed liquid within 30 minutes from the start of stirring. Quartz beads having a particle diameter of 5 μm were immersed in this mixed liquid, and the quartz beads were coated with photocatalyst layers. The quartz beads were taken out from the mixed liquid by filtration, dried in a draft chamber for about 1 hour, and then dried further in an oven at 80° C. Through these steps, a photocatalyst composed of quartz beads and titanium dioxide particles immobilized on the quartz beads by TEOS-derived amorphous silica was obtained. It was confirmed by SEM observation that the titanium dioxide particles were immobilized on the surfaces of the quartz beads by the TEOS-derived amorphous silica. A slurry of the photocatalyst was supplied to the photoreactor similarly to the above, and a comparative solution 1 was thus prepared. The concentration of the titanium dioxide particles in the comparative solution 1 was equal to the concentration in the solution C1 (3.6 g/L).

In addition, a solution in which only nanometer-order titanium dioxide particles were dispersed was also tested as a comparative solution 2. P25 manufactured by Degussa AG was used as the titanium dioxide particles, and the concentration of the titanium dioxide particles was set equal to the titanium dioxide particle concentration in the solution C1 (3.6 g/L). The hexavalent chromium reduction ratio and the sedimentation performance were evaluated using the same hexavalent chromium aqueous solution and the same conditions as employed in Example 2.

Table 2 shows the hexavalent chromium reduction ratio and the sedimentation performance in each of the titanium dioxide composite catalyst solutions having different concentrations and the comparative solutions.

TABLE 2

| | Titanium dioxide composite catalyst solution (concentration) | | | | | Comparative solution 1 | Comparative solution 2 |
|---|---|---|---|---|---|---|---|
| | A1 (0.04 g/L) | B1 (0.4 g/L) | C1 (3.6 g/L) | D1 (16 g/L) | E1 (40 g/L) | (binder process) | (titanium dioxide particles) |
| Cr(VI) reduction ratio [%] | 11.2 | 78.0 | 77.8 | 74.3 | 13.0 | 9.8 | 83.0 |
| Sedimentation performance (Change in light transmittance) | 33% | 32% | 36% | 38% | 35% | 35% | 0% |

In the comparative solution 1 for which a binder was used, the sedimentation performance of the catalyst was at a similar level to that in the composite catalyst solutions A1 to E1 of Example 2. However, the hexavalent chromium reduction ratio was very low, and specifically was 9.8% which was smaller than ⅛ of that in the solution C1. In the comparative solution 2 which was a dispersion liquid of titanium dioxide particles, the hexavalent chromium reduction ratio was 83.0%, which means that the highest decomposing performance was exhibited. However, the sedimentation performance of the catalyst was 0%; namely, the catalyst was not separated by sedimentation at all. On the other hand, for the solutions B1 to D1 used in the present example, it was confirmed that both the hexavalent chromium reduction performance and the sedimentation performance were so high that practical water treatment can be achieved.

Example 3

The water treatment system shown in FIG. 4 was constructed using a concentrated slurry liquid of a titanium dioxide composite catalyst fabricated in the same manner as in Example 1. The concentrated slurry of the titanium dioxide composite catalyst was loaded into the slurry tank 402, and was supplied to the photoreactor 403. An aqueous solution having dissolved therein $Kr_2Cr_2O_7$, which is a hexavalent chromium compound, was used as the water to be treated. The hexavalent chromium compound was dissolved at an aqueous solution concentration of 1000 μg/L, and the resultant solution was then introduced into the photoreactor 403. The concentrated slurry liquid of the catalyst particles was supplied to the photoreactor so that the concentration of the catalyst was 3.6 g/L. Thereafter, UV light irradiation was performed in conjunction with stirring at 200 rpm. The light source 404 was composed of a combination of a xenon light source (MAX 302 manufactured by Asahi Spectra Co., Ltd.) and a band-pass filter. The light had a wavelength λ of 350 nm, a bandwidth of about 10 nm, and an intensity of 1 mW/cm².

The solution having been subjected to the light irradiation was collected, and the concentration of hexavalent chromium in the solution was quantitatively analyzed by HPLC/ICP•MS (manufactured by Agilent). The hexavalent chromium reduction ratio achieved by irradiation for 8 minutes was 77.8%, which revealed that most of the hexavalent chromium was reduced by the photocatalyst. Thus, it was confirmed that the titanium dioxide composite catalyst is effective for reduction, i.e., detoxification of hexavalent chromium which is actually observed in water environments such as groundwater.

The suspension solution having undergone the photoreaction step was introduced to the solid-liquid separation vessel 405. Then, evaluation of gravitational sedimentation was performed by a light transmission method, and evaluation of separation by microfiltration was performed. A HeNe laser (632.8 nm, 3 mW, nonpolarized) was used as the light source for the light transmission method. A fiber coupler including an objective lens was used, laser light was introduced into the fiber, and thus the solid-liquid separation vessel containing the suspension was irradiated with the light. The light having transmitted through the solid-liquid separation vessel 405 was introduced again into the fiber, and finally, a light-receiving surface of a photodiode (C10439-03 manufactured by Hamamatsu Photonics K.K.) was irradiated with the light to measure the transmittance. A sedimentation amount was calculated from the transmittance. The sedimentation amount in 30 minutes was 85±5%. This value was beyond 80% which is a baseline for solid-liquid separation of catalyst particles. Thus, it was confirmed that solid-liquid separation in the suspension was achieved in a short time by sedimentation separation.

Sheets of filter paper made of resin and having an average pore diameter of 0.42 μm were used in a filtration membrane element for the microfiltration. The output flow rate of the treated water in the microfiltration was monitored. The output flow rate was about 100 mL/min, and was stable for 24 hours. The concentration of the catalyst remaining in the treated water was 10 ppm or less. By contrast, in the case of titanium dioxide particles alone, the flow rate which was initially 100 mL/min was decreased to 1.2 mL/min in 8 hours, and clogging of the filtration membrane element was caused.

As described above, Example 3 verified that a water treatment method excellent in both photocatalytic activity and solid-liquid separation performance was achieved using the titanium dioxide composite catalyst.

Example 4

A water treatment system for treating a hexavalent chromium-containing aqueous solution was constructed by the same way as in Example 3. A 1000 μg/L hexavalent chromium aqueous solution was used as the water to be treated. The amount of the titanium dioxide composite catalyst-concentrated slurry supplied was adjusted to prepare five aqueous solutions containing the titanium dioxide composite catalyst at different concentrations, and the hexavalent chromium reduction ratio, the sedimentation amount, and the extraction flow rate of the treated water were evaluated for each solution. The concentration of the titanium dioxide composite catalyst was set to 0.04 g/L for a solution A2, 0.4 g/L for a solution B2, 3.6 g/L for a solution C2, 16 g/L for a solution D2, and 40 g/L for a solution E2. UV light irradiation was performed under the same conditions as in Example 3, and the hexavalent chromium reduction ratio achieved by 8-minute irradiation was evaluated. Furthermore, as in Example 1, a suspension having undergone photodecomposition treatment was introduced to the solid-liquid separation vessel, and the sedimentation amount after 30 minutes and the extraction flow rate of the treated water were evaluated. The hexavalent chromium reduction ratios in the solutions containing the titanium dioxide composite catalyst at concentrations of 0.4 g/L, 3.6 g/L, and 16 g/L were 78.0%, 77.8%, and 74.3%, respectively, which revealed that high reduction performance is exhibited in these solutions. However, the hexavalent chromium reduction ratios in the solutions having catalyst concentrations of 0.04 g/L and 40 g/L were 11.2% and 13.0%, respectively, and were smaller than 1/5 of the hexavalent chromium reduction ratio in the solution having a catalyst concentration of 3.6 g/L. That is, in the treatment method of the present example, the suitable concentration of the catalyst in the solution was 0.4 g/L or more and 16 g/L or less.

Comparative Examples

A photocatalyst composed of quarts beads and titanium dioxide particles immobilized on the quarts beads by TEOS-derived amorphous silica was obtained in the same manner as for the above comparative solution 1. It was confirmed by SEM observation that the titanium dioxide particles were immobilized on the surfaces of the quartz beads by the TEOS-derived amorphous silica. As in Example 4, a concentrated slurry of the photocatalyst was supplied to the photoreactor to prepare a comparative solution 3. The titanium dioxide particle concentration in the comparative solution 3 was equal to the concentration in the solution C2 (3.6 g/L).

In addition, a solution in which only nanometer-order titanium dioxide particles were dispersed as in the comparative solution 2 was tested as a comparative solution 4 in the same manner as in Example 4. P25 manufactured by Degussa AG was used as the titanium dioxide particles, and the concentration of the titanium dioxide particles was set equal to the titanium dioxide particle concentration in the solution C1 (3.6 g/L). The hexavalent chromium reduction ratio, the sedimentation amount, and the extraction flow rate of the treated water were evaluated using the same hexavalent chromium aqueous solution and the same conditions as employed in Example 4.

Table 3 shows the results for each of the catalyst particle solutions having different concentrations and the comparative solutions. In the comparative solution 3 for which a binder was used, the sedimentation amount and the extraction flow rate were at similar levels to those of the catalyst particle solutions A2 to E2 of Example 4; however, the hexavalent chromium reduction ratio was very low, and specifically was 9.8% which was smaller than 1/5 of that in the solution C2. In the comparative solution 4 which was a dispersion liquid of titanium dioxide particles, the hexavalent chromium reduction ratio achieved was 83.0% which was the highest reduction ratio. However, the sedimentation amount was 0%; namely, the catalyst was not separated by sedimentation at all. Moreover, the extraction flow rate was 0 mL/min; namely, the treated water was not able to be separated. On the other hand, for the solutions B2 to D2 used in the present example, it was confirmed that all of the hexavalent chromium reduction ratio, the sedimentation amount, and the extraction flow rate were at such good levels that practical water treatment can be achieved.

TABLE 3

| | Titanium dioxide composite catalyst solution (concentration) | | | | | Comparative solution 3 | Comparative solution 4 |
|---|---|---|---|---|---|---|---|
| | A2 (0.04 g/L) | B2 (0.4 g/L) | C2 (3.6 g/L) | D2 (16 g/L) | E2 (40 g/L) | (binder process) | (titanium dioxide particles) |
| Cr(VI) reduction ratio [%] | 11.2 | 78.0 | 77.8 | 74.3 | 13.0 | 9.8 | 83.0 |
| Sedimentation amount [%] | 81.0 | 82.6 | 85.9 | 88.5 | 89.3 | 89 | 0 |
| Extraction flow rate [ml/minute] | 110 | 100 | 105 | 110 | 100 | 90 | 0 |

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The present disclosure relates to detoxification of hexavalent chromium contained in drinking water, discharged water, continental rivers, lakes, etc., and can provide a method and system that can treat water continuously in a practical time. The method according to the present disclosure can be used for household clean water systems and public clean water systems. Furthermore, the method can be used as one of the steps of effluent treatment in factories or of sewage treatment process.

What is claimed is:

1. A method for treating a hexavalent chromium-containing aqueous solution, comprising:
    a step (a) of adding catalyst particles to the aqueous solution;
    a step (b) of reducing hexavalent chromium by irradiating the aqueous solution with ultraviolet light having a wavelength in a range between 200 nanometers and 400 nanometers, both inclusive, while stirring the catalyst particles in the aqueous solution; and
    a step (c) of stopping the stirring in the step (b) and separating the catalyst particles from the aqueous solution by sedimentation,
    wherein each catalyst particle is composed only of a titanium dioxide particle having an average particle diameter in the range of 1 nm to 100 nm and a zeolite particle having a particle diameter of 1 μm to 10 μm, the titanium dioxide particle is adsorbed on an outer surface of the zeolite particle, the zeolite particle includes silica and alumina, and the catalyst particles are contained in the aqueous solution at a concentration in a range between 0.4 grams/liter and 16 grams/liter, both inclusive, and a change in laser light transmittance of the aqueous solution from before sedimentation to after a sedimentation duration of 30 minutes in the step (c) is 20% or more.

2. The method according to claim 1, comprising a step (d) of adding again the catalyst particles separated by sedimentation in the step (c) to the aqueous solution after the step (c), wherein the step (b) and the step (c) are performed again after the step (d).

3. The method according to claim 1, wherein
the catalyst particles are separated by sedimentation in a solid-liquid separation vessel including a filtration membrane element in the step (c),
the method further comprises a step (e) of producing treated water from the aqueous solution using the filtration membrane element, and
the filtration membrane element used in the step (e) is composed of a plate-shaped frame and sheets of filter paper made of resin and attached to both faces of the frame, and is arranged parallel to a direction in which the catalyst particles are sedimented.

4. The method according to claim 3, comprising a step (f) of adding again the catalyst particles separated by sedimentation in the step (c) to the aqueous solution after the step (c), wherein the step (b), the step (c) and the step (e) are performed again after the step (f).

5. The method according to claim 1, wherein the zeolite particle is a zeolite particle subjected to a process in which an alumina portion is dissolved by treatment with an acid aqueous solution to introduce an active site for direct adsorption of the titanium dioxide particle, and then the acid aqueous solution adhered to the surface of the zeolite particle is removed by washing with water.

6. The method according to claim 1, wherein:
the step (b) is performed in a photo reactor,
the catalyst particles are transferred from the photo reactor to a solid-liquid separation vessel in the step (c), and
the catalyst particles are separated by sedimentation in a solid-liquid separation vessel in the step (c).

* * * * *